US007299452B1

(12) United States Patent
Zhang et al.

(10) Patent No.: US 7,299,452 B1
(45) Date of Patent: Nov. 20, 2007

(54) SYSTEM AND METHOD FOR TESTING THE COMPATIBILITY OF A COMPUTER APPLICATION WITH A FOREIGN CHARACTER SET

(75) Inventors: Wei Zhang, Belmont, CA (US); Yu Chu Yip, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 546 days.

(21) Appl. No.: 10/144,535

(22) Filed: May 10, 2002

(51) Int. Cl.
*G06F 9/44* (2006.01)
*G06F 17/20* (2006.01)
(52) U.S. Cl. .......................... 717/124; 717/131; 704/8
(58) Field of Classification Search ........ 717/122–129, 717/131, 136; 704/2, 5, 8, 9
See application file for complete search history.

(56) References Cited

U.S. PATENT DOCUMENTS

| | | | | |
|---|---|---|---|---|
| 5,572,668 A | * | 11/1996 | See et al. ...................... | 714/38 |
| 5,577,198 A | * | 11/1996 | Willrett et al. ................ | 714/33 |
| 5,583,761 A | * | 12/1996 | Chou ........................... | 715/536 |
| 5,664,206 A | * | 9/1997 | Murow et al. ................. | 704/8 |
| 5,831,560 A | * | 11/1998 | Gelfenbain .................. | 341/106 |
| 6,035,121 A | * | 3/2000 | Chiu et al. ................... | 717/141 |
| 6,138,112 A | * | 10/2000 | Slutz ........................... | 707/2 |
| 6,185,729 B1 | * | 2/2001 | Watanabe et al. ........... | 717/100 |
| 6,453,462 B1 | * | 9/2002 | Meade et al. ................ | 717/124 |
| 6,701,320 B1 | * | 3/2004 | Marple ........................ | 707/100 |
| 2004/0205721 A1 | * | 10/2004 | Colaiuta ....................... | 717/124 |

* cited by examiner

*Primary Examiner*—Meng-Al T. An
*Assistant Examiner*—Jason Mitchell
(74) *Attorney, Agent, or Firm*—Park, Vaughan & Fleming LLP

(57) ABSTRACT

A system and method for testing functionality of an application for compatibility with a foreign character set (e.g., a character set other than a "native" or original character set of the application). Input or output of a master test case designed to test the functionality of the application is converted or mapped to the foreign character set. The mapped test case is then executed or otherwise used to test the application functionality and a log file or output is collected. The log file is mapped back to the native character set and compared to expected test results. Prior to testing, the size of a buffer or data structure used in the testing may be altered according to the character size of the foreign character set, and contents of a database used for testing may be converted to the foreign character set.

26 Claims, 3 Drawing Sheets

SYSTEM AND METHOD FOR TESTING THE COMPATIBILITY OF A COMPUTER APPLICATION WITH A FOREIGN CHARACTER SET

BACKGROUND

This invention relates generally to the field of computer systems. More particularly, a system and method are provided for testing an application or utility for compatibility with a foreign character set or language.

Due to the increasingly global nature of commerce, many software products have markets that transcend language boundaries. Therefore, software must often be compatible with multiple languages, or character sets of multiple languages. No longer can a developer be confident that his or her program will work as intended just because it performs well in the language or character set in which it was developed. Thus, it is becoming imperative that a new or modified software module be tested with character sets of multiple languages.

Because of the incremental manner in which software vendors' products have entered foreign markets, vendors have typically expanded their testing processes, to cover foreign languages, in piecemeal fashion. That is, product testing was typically expanded to include compatibility testing with a new language only when a new country was added as a market or a user of a previously unsupported language was added as a customer.

Because of this incremental approach to language compatibility testing, a software vendor may end up with a significant number of languages that must be tested before an application, utility or other software module can be released. For each language, a substantial level of testing resources may be expended, to pay salaries of personnel fluent in the language, to develop testing materials or test cases in the language, to compare the performance of the program in that language to the desired performance, etc.

Typically, when an application is developed, a test script, test case or set of testing data are generated for testing the performance of the application with a particular character set or language. For each language to be tested for compatibility, the test data are translated to produce test data conforming to the language. Thus, for each language, personnel conversant in that language would have to become familiar with the application, and establish a separate testing environment, which may require reconfiguration of the application or the test data even beyond translation into the target language. Conducting tests in all target languages in a timely fashion (e.g., to allow simultaneous release of the application in multiple countries) can be very difficult.

Thus, a need has arisen for a system and methods for testing software functionality for compatibility with multiple character sets or languages, wherein substantial testing resources need not be expended for each language.

SUMMARY

In one embodiment of the invention, a system and methods are provided for testing the compatibility of an application, routine, utility or other software module with character sets corresponding to different languages. In this embodiment, a single "master" test case for testing the functionality is generated. The master test case may contain statements (e.g., SQL statements), commands (e.g., programming instructions, script commands), data for testing input functionality, output functionality or other data handling functionality of the application, and so on. Data within the master test case may be translated or mapped from an original (or "native") character set to a foreign character set to test the application's compatibility with that foreign character set. Results of the testing may then be translated or mapped back to the native character set for determining the performance of the application when working with the foreign character set.

In an embodiment of the invention, depending on the foreign character set, components of an application being tested (e.g., a database, a cache) may be modified to accommodate the character set. For example, the size of a buffer or data structure may be expanded or contracted, or a set of data (e.g., a database) other than the testing data may be translated or mapped to the foreign character set.

In one embodiment of the invention, the master test case is first converted to a standardized form, before being mapped to the foreign character set. Illustratively, within the standardized form individual characters of input or output may be marked or tagged to facilitate the mapping. Also, sizes of buffers or data structures may be tagged to facilitate their modification in preparation of testing. Each tagged character in the standardized form may then be replaced with a character from the foreign character set.

DETAILED DESCRIPTION

Figure 1:
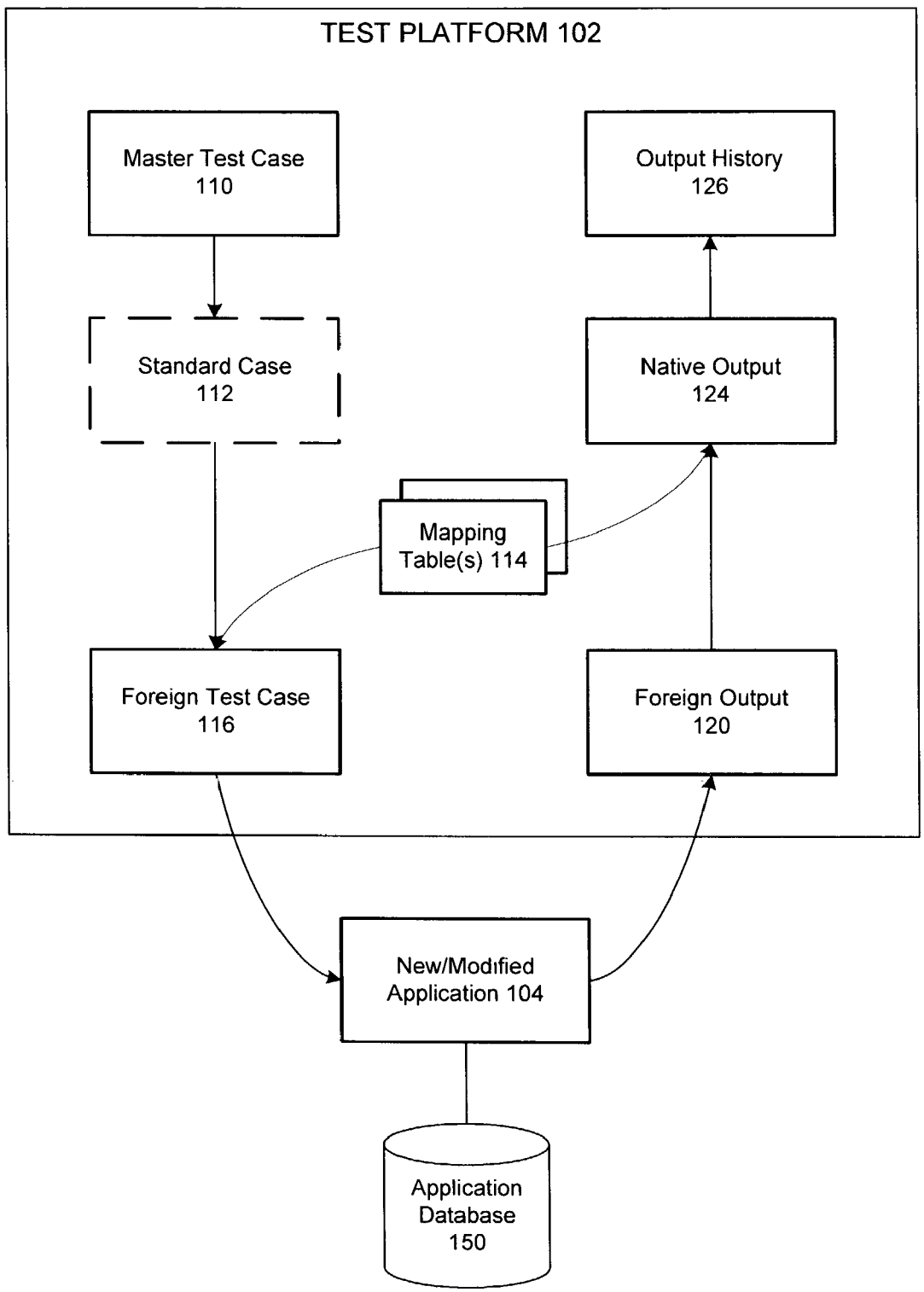
FIG. 1 is a block diagram of a multi-language testing environment, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, and transmission media (e.g., copper wire, coaxial cable, fiber optic media). Exemplary carrier waves on the transmission media may take the form of electrical, electromagnetic or optical signals conveying digital data streams along a local network, a publicly accessible network such as the Internet or some other communication link.

In one embodiment of the invention, a system and method are provided for testing operation of a software program or module with a "foreign" character set other than the original or "native" character set in which the program or module was developed. Testing may be desired to ensure the program functions as desired when using the foreign character set. The program being tested may comprise an application, a subset of an application, an application interface, a utility or some other set of computer executable instructions. The program may be intended for operation on a client (e.g., a personal computer, a hand-held device), a server (e.g., application server, data server, mid-tier server, web server) and/or some other entity.

In this embodiment, a master test case configured to test some or all of the functionality of the program is generated. For example, if the program is a DBMS (Database Management System), the master test case may be configured to test operation of the database or a database interface, perhaps to ensure that data are stored and retrieved correctly, that data are not corrupted when being communicated between a client and a server, etc. Illustratively, the master test case is generated using the same character set, and same language, in which the program was developed.

In an embodiment of the invention, the master test case may comprise a sequence of script commands, a series of SQL (Structured Query Language) statements, a series of XML (Extensible Markup Language) or HTML (Hypertext Markup Language) statements, an applet or program written in Java, C, C++ or some other programming language, a set of data for performing input, output or other data handling, etc. The master test case may thus be executable by itself, or may be invoked in conjunction with an application interface, may be used as input to a program module or function, or may be used in some other way to exercise functionality of the program being tested.

FIG. 1 depicts components of a system for testing an application's functionality with a foreign character set, according to one embodiment of the invention. In this embodiment, the application is a DBMS or DBMS module and the testing may be conducted to ensure the proper storage and/or retrieval of data expressed in different character sets.

In the embodiment of FIG. 1, test platform 102 may comprise a personal or mobile computer, a hand-held device, a server or some other computing device. Database 150 comprises a database or set of data used by the application. Database 150 may reside on testing platform 102 or may be located on a computing device separate from the testing platform.

Application 104 comprises a complete application or a set of one or more application modules. Application 104 is new or has been modified from a previous version (e.g., to include additional functionality, to alter its previous behavior).

In this embodiment of the invention, master test case 110 is generated to test some or all of the functionality of application 104. As described above, master test case 110 may comprise computer executable instructions, a script file, input for controlling operation of application 104 or some other data designed to test the application's functionality.

Because master test case 110 may comprise executable code for testing particular functionality of application 104, as well as data to be operated upon by that functionality, not all of master test case 110 may need to be converted to a foreign character set for the testing. In particular, only the data that will be manipulated, altered or processed by the application need to be converted. The commands or statements of the master test case may remain in a character set used by the application or understood by the processor that will execute or invoke the testing. This may be considered the native or original character set.

Foreign test case 116 is generated by mapping, converting or translating test data of master test case 110 using mapping table or file 114.

In the illustrated embodiment of the invention, mapping table 114 facilitates mapping or conversion from the original character set to a foreign character set (i.e., a character set other than the original character set), and/or vice versa. In particular, mapping table 114 may be configured to facilitate mapping or conversion in both directions. However, in an alternative embodiment of the invention, different mapping tables or other modules or utilities may be used for each direction.

In one embodiment of the invention, the original character set is ASCII or some other character set suitable for expressing English (e.g., EBCDIC, UTF8). The foreign character set may be JA16SJIS (Japanese), JA16EUC (Japanese), UTF8 (Unicode), ISO 8859P1 (West European), ISO 8859-5 (Cyrillic) or virtually any other character set, now known or hereafter developed.

In one implementation of this embodiment, each individual character of test data, of master test case 110, that will be used to test the functionality of application 104 (e.g., by being written to or read from database 150) is mapped to a character of the foreign character set. Thus, in this implementation, the test data are not translated to retain the meaning or significance of the data. A character-for-character substitution allows testing of the application's handling of the replacement data of foreign test case 116 (e.g., to ensure that the replacement characters are not corrupted) without requiring complete knowledge of the language(s) to which the foreign character set corresponds.

However, in an alternative embodiment of the invention, foreign test case 116 may comprise a meaningful translation of test data of master test case 110, so that some or all of the meaning or intelligence of the test data is retained.

When foreign test case 116 is executed or otherwise used to test application 104, it interfaces with database 150. It may, for example, cause characters in the foreign character set to be written to, read from or otherwise manipulated by the database.

Based on the testing of the application with foreign test case 116, foreign output 120 is generated. Foreign output 120 may comprise a log file indicating how the application handled or manipulated the test data of the foreign test case, may mirror the input and/or output of the database or program during testing, etc.

A mapping table or utility (e.g., mapping table 114) may then be used to map, convert or translate the foreign characters (i.e., characters from the foreign character set) of foreign output 120 back to the original character set. The mapped or converted data are stored as native output 124. Native output 124 can then be examined for accuracy. For example, the native output may be compared to the expected output of master test case 110. If they match, then it may be considered that the tested functionality of application 104 manipulated the foreign test data correctly.

The native output, and/or the foreign output, may be saved to output history 126. Output history 126 may be used when testing a later version of application 104, or other functionality of the application, to ensure the results match those of a previous version, or to determine how the results changed.

In one embodiment of the invention, application 104, master test case 110, and native output 124 are expressed using the same character set, which is, or comprises, the original character set. The contents of output history 126 may also be expressed in the original character set.

In one embodiment of the invention, standard or intermediate case 112 may be used to assist the mapping or conversion of master test case 110 to foreign test case 116 and/or from foreign output 120 to native output 124. In this embodiment, and as discussed below, each character of test data from the master test case is converted into a standardized character format. Standard case 112 comprises the master test case after such conversion. The standardized character formats of standard case 112 can then be mapped to individual characters of the foreign character set. More particularly, in one implementation of this embodiment, each character of test data in master test case 110 may be marked with a tilda (i.e., "~") or other symbol or combination of symbols.

The process of converting character data from one character set (an input set) to another (the output set) may involve predetermined mappings. For example, mapping table 114 of FIG. 1 may comprise information indicating, for a given character in the input character set, which character in the foreign character set the character should be mapped to. Or, a separate character mapping file tying a character of the original character set to the foreign character set, or vice versa, may be used.

In an embodiment of the invention in which standard case 112 is applied, a mapping table or file may include tuples in the form {character1, standard, character2}. In this tuple, "standard" refers to the standard (or marked) character format. "Character1" and "character2" are the characters in the different character sets to be mapped to each other. In this embodiment, the same or a different mapping file may be used when converting from native characters in a test case to foreign characters in a foreign test case as when converting from foreign output characters to native output characters.

For example, if the native character set is ASCII and a foreign character set is Cyrillic, and the ASCII character "a" is to be mapped to "л" then the corresponding tuple in the mapping file may appear as {a, ~a, л}. When mapping the standard format of the master test case into the foreign test case, an occurrence of "~a" would be replaced with "л". This tuple may also be used to convert directly from the native character ("a") to the foreign character ("л") without using the standard form.

Also, when mapping foreign output to native output in this example, an occurrence of "~a" (if the standard format is being applied) or "л" (without using standard format) would be mapped to "a".

As part of the preparation for applying a foreign test case (e.g., foreign test case 116 of FIG. 1) to test the functionality of an application, in one embodiment of the invention a buffer size may be expanded or contracted to accommodate the foreign character set. For example, if the native character set is ASCII, which requires only one byte of storage per character, and the foreign character set is JAI 6SJIS or some other set that requires multiple bytes per character, a buffer size and/or size of another application data structure may be expanded.

Thus, if the master test case called for a string of 20 characters (e.g., "char(20)"), the size of the string may be increased according to the ratio of the size of a foreign character to the size of a native character. If the foreign character set requires two bytes for each character, this string may be changed to 40 characters (e.g., "char(40)").

Therefore, if a standard format (e.g., standard case 112 of FIG. 1) is applied, data structure sizes may be marked or tagged in a manner similar to characters of test data. Illustratively, in each string declaration—whether a char, varchar, varchar2 or other type—the size is marked for modification. "Varchar(15)" may therefore be tagged as "varchar(~15)." Then, during the mapping process (e.g., from standard case 112 to foreign test case 116), the string sizes are increased (or decreased) by the ratio described above.

Also, in one embodiment of the invention, if the application (or module) being tested will access a database or other collection of data, the database may be converted or mapped to the same character set as the foreign test case (i.e., the foreign character set).

Figure 2:
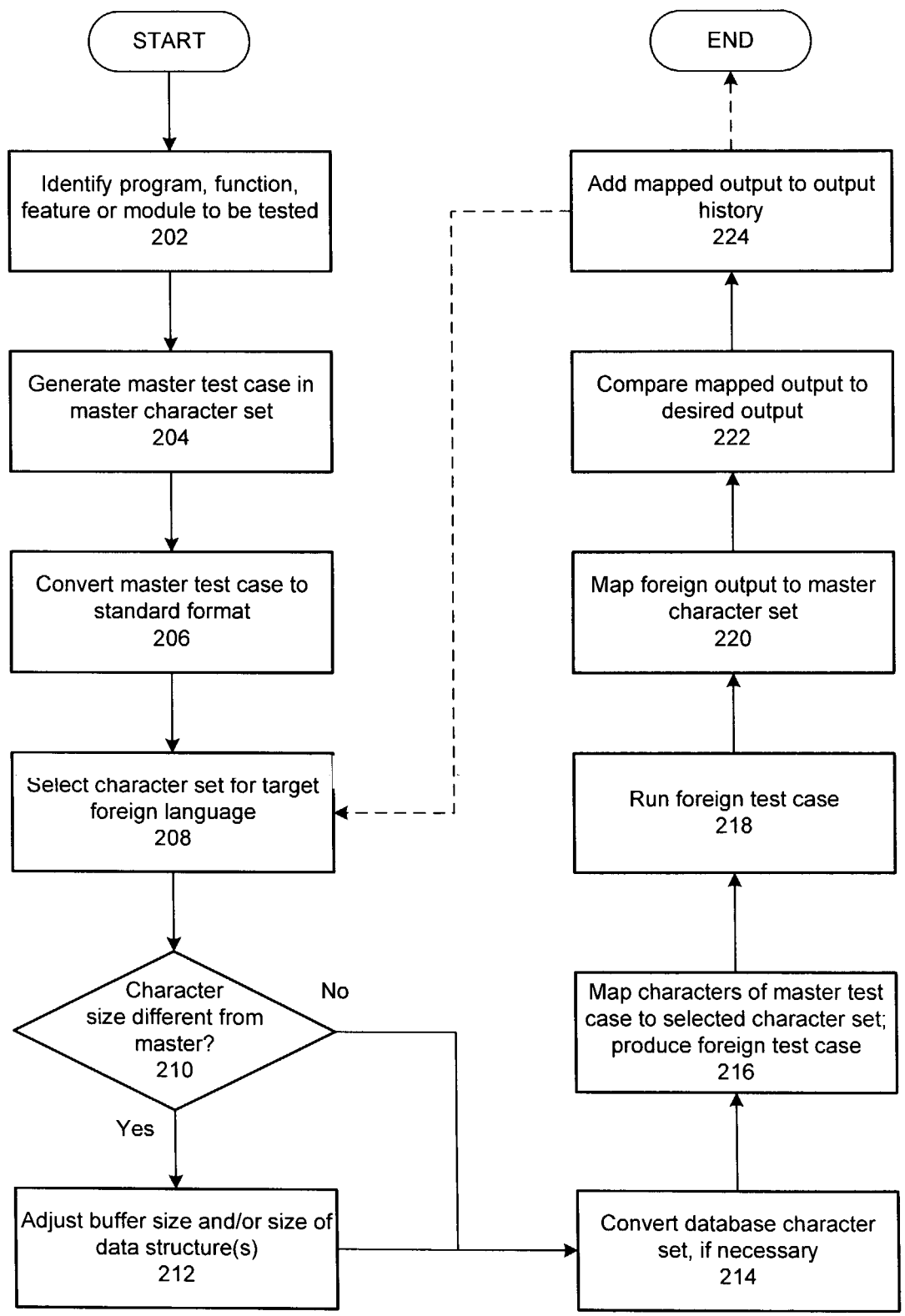
FIG. 2 is a flowchart demonstrating a method of testing the compatibility of an application with a foreign character set, in accordance with an embodiment of the invention.

FIG. 2 is a flowchart demonstrating a method of testing a software module for compatibility with one or more character sets, according to one embodiment of the invention. In this embodiment, the software module may comprise a complete application or some portion of the functionality of a complete application.

In state 202, the application functionality to be tested is identified (e.g., as a distinct module). The functionality to be tested may comprise one or more input or output operations, or other operations that require manipulation of data.

In state 204, a master test case for testing the application is generated. The master test case may comprise a sequence of programming instructions (e.g., in Java, C++ or other programming language), a series of statements (e.g., in SQL) or script commands, data to be handled by the application, etc. The master test case may, in one embodiment of the invention, comprise the entire application or software module whose functionality is being tested.

In state 206, the master test case is converted to a standard, intermediate or normalized format. As described above, this may entail the substitution of marked or tagged characters for each character of input and/or output included in the master test case. Illustratively, the master test case may be scanned (manually or automatically) for a string, an array of characters, a constant, etc. Each character may then be marked with a symbol (e.g., "~") to facilitate the process of mapping the character from one character set to another.

In an embodiment of the invention in which the application being tested is part of a DBMS, such as Oracle® Server by Oracle Corporation, the master test case may be searched for data types such as: CHAR, VARCHAR2, NCHAR, NVARCHAR2, NUMBER, CLOB and so on. These data types may indicate input/output that should be marked, and may also facilitate the modification of buffers or data structures, as described below.

In state 208, a character set is selected for testing. The selected character set may be referred to as a foreign character set because it is foreign to the character set of the master test case.

Illustratively, the master test case may be used (after being mapped into different character sets) to test the software module's compatibility with all character sets the software module will be used with, or some subset of those character sets. Each character set may correspond to a different language, or there may be a many-to-one ratio between character sets and languages, or vice versa.

In state 210, the character size of the selected character set is compared to the character size of the character set of the master test case. If they are the same, the illustrated method advances to state 214; otherwise, the method continues at state 212.

In state 212, the size of one or more buffers or data structures used to execute the master test case may be adjusted, if necessary. For example, if the character size of the character set used for the master test case is one byte, but the character size of the foreign test character set is multi-byte, then a buffer or data structure may be expanded to ensure that the same number of characters, in the foreign character set, can fit in the buffer or data structure. Conversely, if the character size of the character set used for the master test case is multiple bytes, but the character size of the foreign test character set is one byte, a buffer or data structure may be compressed.

In an embodiment of the invention in which data types such as CHAR, VARCHAR2, and so on, are located, the buffer size or dimension of the data type may be easily located and adjusted as necessary. These dimensions may have been tagged or marked as part of the conversion of the master test case to the standardized format (in state 206 above).

In one embodiment of the invention, the size of a buffer or data structure used by the software module or master test case may be defined in characters rather than in bytes—perhaps by using code point semantics. If so, and changing the character set of the master test case or the character set of a database or other set of data used for testing is sufficient to invoke or apply the code point semantics, then the size of the buffer or data structure need not be modified.

In state 214, contents of a database, table or other set of data used during testing may be converted from one character set (e.g., that of the master test case or software module) to another (e.g., the selected character set or some other character set). This may be done to ensure that an input or output operation of the master test case, when working with the foreign character set, will be able to work with the database.

In state 216, each marked or tagged character in the standardized or normalized form of the master test case is mapped, converted or translated to a character in the foreign character set. Illustratively, each occurrence of a specific character in the character set of the master test case is mapped to the same character in the foreign character set.

A character mapping file may be employed to indicate or record each character appearing in the master test case and the character of the selected character set to which the master test case character should be, or is, mapped. Illustratively, this also facilitates reversal of the mapping to return the output of the test to the character set of the master test case. The test case as it appears with mapped characters may be considered a foreign or mapped test case.

In state 218, the foreign test case (i.e., the master test case containing characters from the selected foreign character set) is then executed, invoked or otherwise used to test the desired functionality of the software module.

In state 220, the output or log file of the executed foreign test case is mapped back to an original or other character set (e.g., that of the master test case). Illustratively, the output or log file reflects how each foreign character of the foreign test case was written to, stored in or read from a database, table, communication module or other module or component used in regular operation of the software module. This allows an input/output operation or other data processing functionality of the software module to be examined to ensure that it handles the foreign characters (i.e., characters of the foreign character set) correctly.

In state 222, the mapped output or log file (e.g., in the character set of the master test case) is compared to an expected or desired output or log file. If they match, then it may be considered that the tested functionality of the software module handled the foreign character set correctly.

In state 224, the output or log file (in the foreign or master character set) may be saved to a historical database or file. This may be done to ensure consistent behavior of the software module over time. That is, if the behavior of the software module is expected to remain the same from one release or version to another, the history may be used to compare tested behavior to ensure that it does remain the same. Or, the history may be used to ensure that the behavior changes as expected from one release of the software module to another.

After state 224, the illustrated method may end or return to state 208 to select another foreign character set for testing.

In different embodiments of the invention, different sets of parameters may be specified when a software module is to be tested for compatibility with a foreign character set. For example, the native character set (e.g., the character set of the master test case), the foreign character set and the character set that any database or set of data should be converted to for testing may be identified. The database character set may be the same as the foreign character set. Also, a character mapping file may be identified, which indicates the mapping to be applied between characters of the native character set and characters of the foreign character set.

Figure 3:
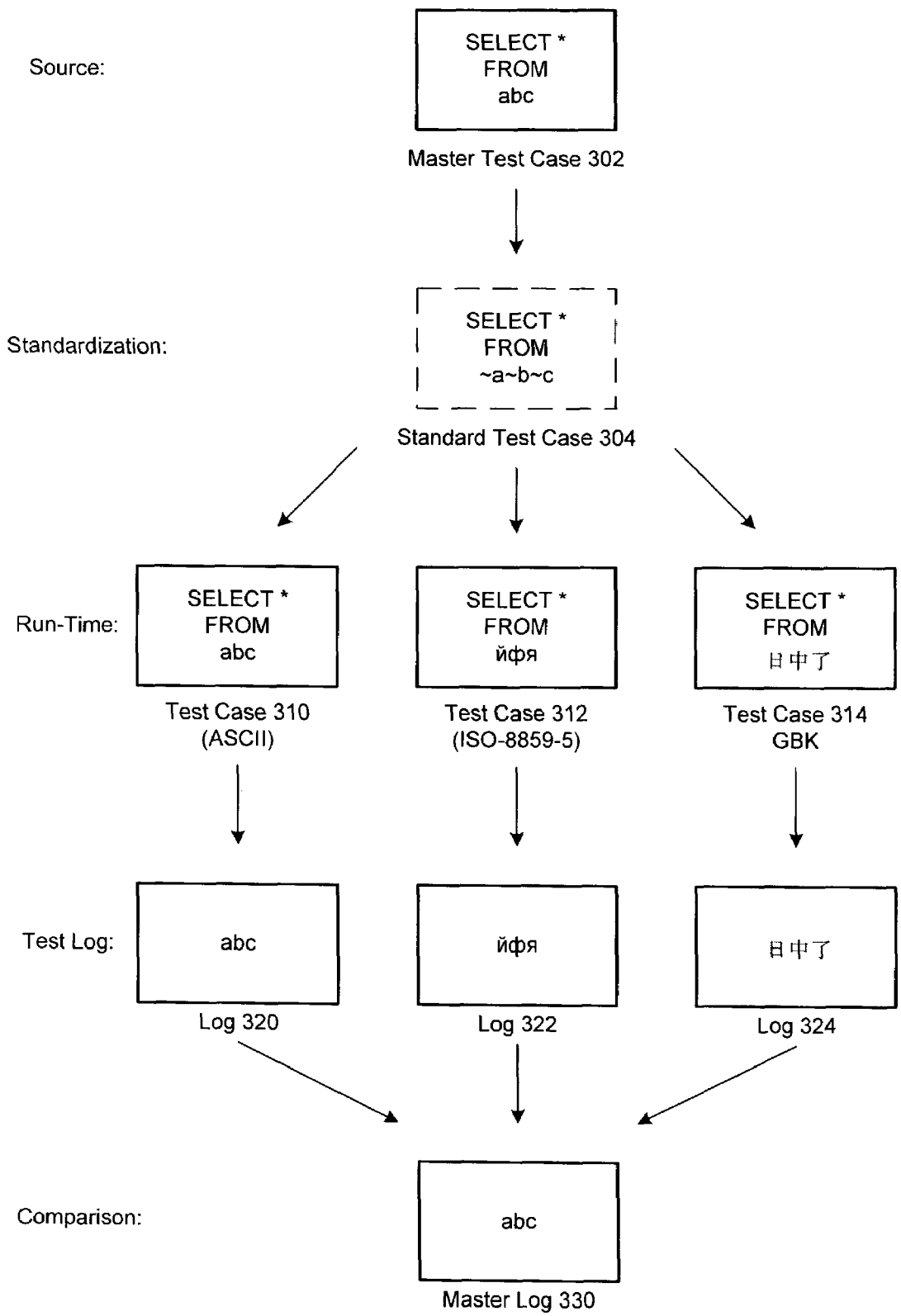
FIG. 3 demonstrates a testing process in which a master test case is mapped to a foreign character set and a log file is mapped back to a native character set, in accordance with an embodiment of the present invention.

FIG. 3 demonstrates the conversion or mapping of a master test case from a native character set (i.e., ASCII) to a foreign character set, the production of a test log and the conversion of the log back to the native character set, according to one embodiment of the invention.

In FIG. 3, master test case 302 includes a SQL SELECT statement. The table name for the SELECT statement is "abc." Optional standard test case 304 shows the marking of each character of the table name, to facilitate mapping that name to a foreign character set. FIG. 3 demonstrates testing for three character sets—the native character set of the master test case, Cyrillic (ISO-8859-5) and GBK.

Thus, at testing time, master test case 302 or standard test case 304 is converted or mapped to test cases 310, 312, 314. The tests may run in parallel or in series. For each test, a test log is produced. Test log 320 contains the results of test case 310, test log 322 captures the results (e.g., the input/output) of test case 312, and test log 324 corresponds to test case 314.

Each test log is then converted or mapped back a log file expressed in the native character set and is compared with a master log comprising the expected results. In this embodiment, the re-mapping of one log file does not overwrite another, and master test log 330 demonstrates that the re-mapping of test logs 320, 322 and 324 will or should be identical.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of testing a program module for compatibility with a foreign character set, comprising:

generating a first test set for testing the program module, wherein said first test set is expressed in a first character set corresponding to a first language;

selecting a second character set corresponding to a second language;

mapping said first test set to a second test set that includes characters from the second character set, wherein said mapping comprises mapping the first character set into the second character set through a standard intermediate form, wherein the standard intermediate form corresponds to multiple character sets associated with multiple languages, including the second language;

implementing said second test set to produce a second set of output expressed in the second character set, wherein producing the second set of output involves adjusting a size of a buffer for the second set of output based upon the encoded size of characters in the second character set so that the buffer is able to accommodate a second set of output which contains the same number of characters as the first test set;

mapping said second set of output from the second character set to a first set of output expressed in the first character set; and comparing said first set of output to an expected set of output to determine if the program module operated correctly with said second test set.

2. The method of claim 1, wherein said converting the first test set comprises marking each character of an input/output operation.

3. The method of claim 2, wherein said mapping said first test set further comprises:

mapping said marked characters to the second character set.

4. The method of claim 1, wherein said mapping said first test set comprises:

mapping a set of characters in said first test set from the first character set to the second character set.

5. The method of claim 1, wherein said implementing comprises:

executing the program module using said second test set.

6. The method of claim 1, wherein said implementing comprises:

executing the second test set.

7. The method of claim 1, further comprising:

determining whether a data storage used by the program module is compatible with the second character set; and modifying the data storage to accommodate the second character set.

8. The method of claim 1, further comprising:

identifying a database used by the program module; and converting contents of the database to the second character set.

9. A computer readable storage medium storing instructions that, when executed by a computer, cause the computer to perform a method of testing a program module for compatibility with a foreign character set, wherein the computer readable storage medium includes one of a volatile memory, a non-volatile memory, and a transmission medium comprising copper wire, coaxial cable, of fiber optic cable, the method comprising:

generating a first test set for testing the program module, wherein said first test set is expressed in a first character set corresponding to a first language;

selecting a second character set corresponding to a second language;

mapping said first test set to a second test set that includes characters from the second character set, wherein said mapping comprises mapping the first character set into the second character set through a standard intermediate form, wherein the standard intermediate form corresponds to multiple character sets associated with multiple languages, including the second language;

implementing said second test set to produce a second set of output expressed in the second character set, wherein producing the second set of output involves adjusting a size of a buffer for the second set of output based upon the encoded size of characters in the second character set so that the buffer is able to accommodate a second set of output which contains the same number of characters as the first test set;

mapping said second set of output from the second character set to a first set of output expressed in the first character set; and comparing said first set of output to an expected set of output to determine if the program module operated correctly with said second test set.

10. A method of testing a set of computer programming instructions for compatibility with a foreign language, the method comprising:

generating a master test case for testing operation of the computer programming instructions, wherein said master test case is expressed in a first character set corresponding to a first language;

converting the master test case to a language testing format; and for each of a plurality of languages foreign to the first language:

mapping a portion of the master test case to a foreign character set corresponding to the foreign language to produce a foreign test case, wherein said mapping comprises mapping the first character set into a foreign character set through a standard intermediate form, wherein the standard intermediate form corresponds to multiple character sets associated with multiple foreign languages;

adjusting a size of a buffer for the second set of output based upon the encoded size of characters in the second character set so that the buffer is able to accommodate a second set of output which contains the same number of characters as the first test set;

invoking the foreign test case to produce a set of foreign output expressed in the foreign character set;

mapping said set of foreign output to a first set of output expressed in the first character set; and examining said first set of output to determine if said foreign test case operated as desired.

11. The method of claim 10, wherein said mapping a portion of the master test case comprises:

for each character in a first set of characters in the master test case, replacing the character with a character of the foreign character set.

12. The method of claim 11, wherein said first set of characters in the master case comprise input/output.

13. The method of claim 10, wherein said converting the first test set into an intermediate form comprises:

marking a first character in the master test case; and wherein said mapping said portion of the master test case comprises:
mapping said marked first character to a character of the foreign character set.

14. The method of claim 10, wherein said adjusting the storage capacity of a data structure comprises:
increasing the size of the data structure to accommodate multi-byte characters.

15. The method of claim 10, further comprising:
identifying a database accessed during execution of the programming instructions; and
converting contents of the database to the foreign character set.

16. A computer readable storage medium storing instructions that, when executed by a computer, cause the computer to perform a method of testing a set of computer programming instructions for compatibility with a foreign language, wherein the computer readable storage medium includes one of a volatile memory, a non-volatile memory, and a transmission medium comprising copper wire, coaxial cable, of fiber optic cable, the method comprising:
generating a master test case for testing operation of the computer programming instructions, wherein said master test case is expressed in a first character set corresponding to a first language;
converting the master test case to a language testing format; and
for each of a plurality of languages foreign to the first language:
mapping a portion of the master test case to a foreign character set corresponding to the foreign language to produce a foreign test case, wherein said mapping comprises mapping the first character set into the foreign character set through a standard intermediate form, wherein the standard intermediate form corresponds to multiple character sets associated with multiple foreign languages;
adjusting a size of a buffer for the second set of output based upon the encoded size of characters in the second character set so that the buffer is able to accommodate a second set of output which contains the same number of characters as the first test set;
invoking the foreign test case to produce a set of foreign output expressed in the foreign character set;
mapping said set of foreign output to a first set of output expressed in the first character set; and
examining said first set of output to determine if said foreign test case operated as desired.

17. A method of testing a database application for compatibility with multiple character sets, comprising:
generating a test case for testing a database application configured to facilitate interaction with a database, wherein the test case interacts with the database using a first character set corresponding to a first language;
mapping a set of characters in the test case from the first character set to a second character set corresponding to a second language, wherein said mapping comprises mapping the first character set into the second character set through a standard intermediate form, wherein the standard intermediate form corresponds to multiple character sets associated with multiple languages including the second language;
converting contents of the database from the first language to the second language;
adjusting a size of a buffer for the second set of output based upon the encoded size of characters in the second character set so that the buffer is able to accommodate a second set of output which contains the same number of characters as the first test set;
implementing the test case;
mapping a set of output of the executed test case from the second character set to the first character set; and
comparing said set of output to a desired set of output.

18. The method of claim 17, wherein said converting the test case comprises replacing a set of input/output characters with marked characters.

19. The method of claim 18, wherein said mapping a set of characters in the test case comprises:
mapping each of said marked characters to a predetermined character in the second character set.

20. A computer readable storage medium storing instructions that, when executed by a computer, cause the computer to perform a method of testing a database application for compatibility with multiple character sets, wherein the computer readable storage medium includes one of a volatile memory, a non-volatile memory, and a transmission medium comprising copper wire, coaxial cable, of fiber optic cable, the method comprising:
generating a test case for testing a database application configured to facilitate interaction with a database, wherein the test case interacts with the database using a first character set corresponding to a first language;
mapping a set of characters in the test case from the first character set to a second character set corresponding to a second language, wherein said mapping comprises mapping the first character set into the second character set through a standard intermediate form, wherein the standard intermediate form corresponds to multiple character sets associated with multiple languages, including the second language;
converting contents of the database from the first language to the second language;
adjusting a size of a buffer for the second set of output based upon the encoded size of characters in the second character set so that the buffer is able to accommodate a second set of output which contains the same number of characters as the first test set;
implementing the test case;
mapping a set of output of the executed test case from the second character set to the first character set; and
comparing said set of output to a desired set of output.

21. An apparatus for testing the compatibility of an application with a foreign character set, wherein the apparatus includes one or more of a microprocessor, an application specific integrated circuit and a programmable logic device, the apparatus comprising:
a master test module configured with master data for testing functionality of the application, wherein the master data are expressed in a first character set;
a first foreign test module configured with foreign data for testing the functionality of the application, wherein the foreign data are expressed in a first foreign character set;
an adjusting module configured to adjust a size of a buffer for the first data so that the buffer is able to accommodate a second set of output which contains the same number of characters as the master data;
a first mapping module configured to map the master data to the foreign data, wherein said mapping comprises mapping the first foreign character set into the second character set through a standard intermediate form, wherein the standard intermediate form corresponds to multiple character sets associated with multiple languages;

a first log comprising results of the testing of the functionality of the application with the first foreign test module; and a second mapping module configured to map contents of said first log from the first foreign character set to a second character set.

22. The apparatus of claim 21, wherein said first character set comprises said second character set.

23. The apparatus of claim 21, further comprising:
a master log comprising expected results of the testing of the functionality of the application.

24. The apparatus of claim 21, further comprising:
a mapping file comprising, for each character in the first character set:
said character; and
a foreign character in the first foreign character set to map said character to;
wherein said first mapping module is configured to map said character to said foreign character in accordance with said mapping file.

25. The apparatus of claim 24, wherein said mapping file further comprises, for each character in the first character set:

a standard form of said character;

wherein said first mapping module is configured to map said character to said foreign character by first replacing said character with said standard form of said character and then replacing said standard form with said foreign character.

26. The apparatus of claim 21, further comprising:

a data converter configured to convert a set of data, other than the master data, to the first foreign character set;

wherein the set of data is accessed during the testing of the functionality of the application.

* * * * *

UNITED STATES PATENT AND TRADEMARK OFFICE
CERTIFICATE OF CORRECTION

PATENT NO.        : 7,299,452 B1
APPLICATION NO.   : 10/144535
DATED             : November 20, 2007
INVENTOR(S)       : Zhang et al.

It is certified that error appears in the above-identified patent and that said Letters Patent is hereby corrected as shown below:

In column 6, line 3, delete "JAI 6SJIS" and insert -- JA16SJIS --, therefor.

In column 9, line 36, in Claim 3, delete "claim 2," and insert -- claim 1, --, therefor.

In column 9, line 66, in Claim 9, delete "of" and insert -- or --, therefor.

In column 11, line 20, in Claim 16, delete "of" and insert -- or --, therefor.

In column 11, line 61, in Claim 17, after "languages" insert -- , --.

In column 12, line 10, in Claim 19, delete "claim 18," and insert -- claim 17, --, therefor.

In column 12, line 20, in Claim 20, delete "of" and insert -- or --, therefor.

Signed and Sealed this

Twenty-first Day of October, 2008

JON W. DUDAS
*Director of the United States Patent and Trademark Office*